United States Patent
Byers et al.

(10) Patent No.: US 10,503,148 B2
(45) Date of Patent: Dec. 10, 2019

(54) SYSTEM AND METHOD FOR DIFFUSER HOLE CREATION

(71) Applicant: General Electric Company, Schenectady, NY (US)

(72) Inventors: Jason Anton Byers, Greenville, SC (US); Anthony Centa, Greenville, SC (US); Zhaoli Hu, Greenville, SC (US); Brian Christopher Wheeler, Greenville, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/473,297

(22) Filed: Mar. 29, 2017

(65) Prior Publication Data
US 2018/0284723 A1    Oct. 4, 2018

(51) Int. Cl.
G05B 19/4097    (2006.01)
(52) U.S. Cl.
CPC .............. *G05B 19/4097* (2013.01); *G05B 2219/35134* (2013.01)
(58) Field of Classification Search
None
See application file for complete search history.

(56) References Cited

U.S. PATENT DOCUMENTS

| 5,465,780 A | 11/1995 | Muntner et al. |
| 5,609,779 A * | 3/1997 | Crow ............... B23K 26/0622 219/121.71 |
| 2006/0229759 A1 | 10/2006 | Luketic et al. |
| 2015/0134301 A1 | 5/2015 | Ramamurthy |

OTHER PUBLICATIONS

Takeuchi et al., 6-Axis control ultraprecision microgrooving on sculptured surfaces with non-rotational cutting tool, CIPR Annals, Manufacturing Technology 58 (2009) pp. 53-56.*
Kim et al., "Hybrid micromachining using a nanosecond pulsed laser and micro EDM", 2010 IOP Publishing Ltd.*
Rouser, Kurt P., "Use of dimples to suppress boundary layer separation on a low pressure turbine blade", USAF, 2002.*

* cited by examiner

*Primary Examiner* — Carlos R Ortiz Rodriguez
(74) *Attorney, Agent, or Firm* — Fletcher Yoder, P.C.

(57) ABSTRACT

A computer aided technology system includes a processor. The processor may receive a design model for a blade that has multiple diffuser holes. Also, the processor may derive a hole position and a vector for each of the multiple diffuser holes. In addition, the processor may translate the hole position to a machine coordinate system to create a translated hole position. Moreover, the processor may generate a manufacturing program based on the translated hole position and the vector. The blade includes a stator vane, a rotor vane, or a combination thereof. Further, the blade is included in a compressor, a gas turbine engine, or a combination thereof.

19 Claims, 5 Drawing Sheets

SYSTEM AND METHOD FOR DIFFUSER HOLE CREATION

BACKGROUND

The subject matter disclosed herein relates to systems and methods for the creation, for example, of diffuser holes.

Industrial machines, such as gas turbine systems, may provide for the generation of power. For example, the gas turbine systems typically include a compressor for compressing a working fluid, such as air, a combustor for combusting the compressed working fluid with fuel, and a turbine for turning the combusted fluid into a rotative power. For example, the compressed air is injected into a combustor, which heats the fluid causing it to expand, and the expanded fluid is forced through the gas turbine. The gas turbine may then convert the expanded fluid into rotative power, for example, by a series of blade stages of the turbine. The rotative power may then be used to drive a load, which may include an electrical generator producing electrical power and electrically coupled to a power distribution grid. The turbine blades may include diffuser holes to adjust the aerodynamics of the blades. The diffuser holes may be used to provide cooling to the turbine blade, to prevent Mach speeds, or for some other aerodynamic purposes. It may be beneficial to improve the manufacture of diffuser holes.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a computer aided technology system includes a processor. The processor is configured to receive a design model for a blade that has multiple diffuser holes. Also, the processor is configured to derive a hole position and a vector for each of the multiple diffuser holes. In addition, the processor is configured to translate the hole position to a machine coordinate system to create a translated hole position. Moreover, the processor is configured to generate a manufacturing program based on the translated hole position and the vector. The blade includes a stator vane, a rotor vane, or a combination thereof. Further, the blade is included in a compressor, a gas turbine engine, or a combination thereof.

In a second embodiment, a method includes receiving, via a processor, a design model for a blade that has multiple diffuser holes. The method further includes deriving, via the processor, a hole position and a vector for each of the multiple diffuser holes. Also, the method includes translating, via the processor, the hole position to a machine coordinate system to create a translated hole position. In addition, the method includes generating, via the processor, a manufacturing program based on the translated hole position and the vector. The blade includes a stator vane, a rotor vane, or a combination thereof. Further, the blade is included in a compressor, a gas turbine engine, or a combination thereof.

In a third embodiment, one or more tangible, non-transitory, machine-readable media including instructions are configured to cause a processor to receive a design model for a blade that has multiple diffuser holes. Further, the media is configured to cause the processor to derive a hole position and a vector for each of the multiple diffuser holes. Also, the media is configured to cause the processor to translate the hole position to a machine coordinate system to create a translated hole position. Moreover, the media is configured to cause the processor to generate a manufacturing program based on the translated hole position and the vector. The blade includes a stator vane, a rotor vane, or a combination thereof. Further, the blade is included in a compressor, a gas turbine engine, or a combination thereof.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
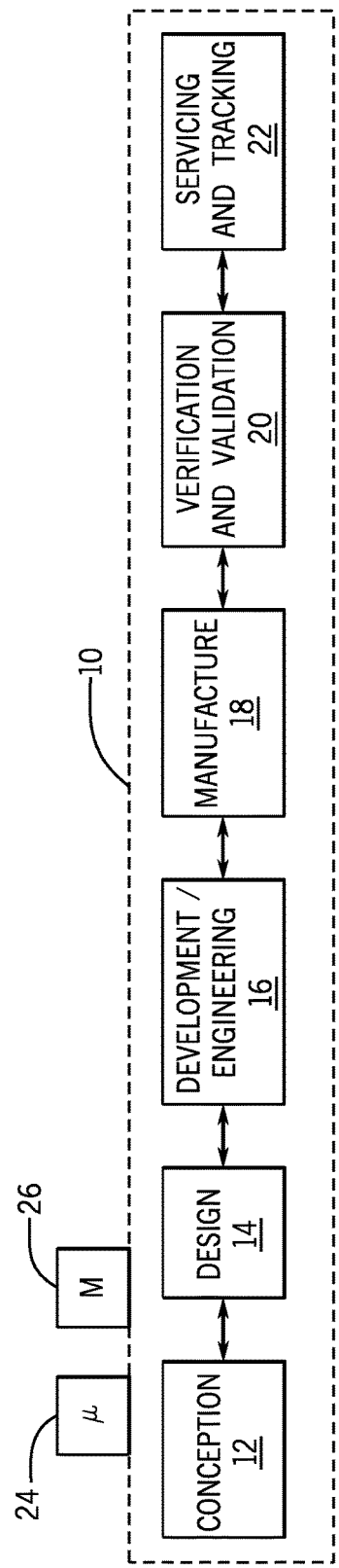
FIG. 1 is a block diagram of an embodiment of a computer-aided technology (CAx) system.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Turbine blades within a turbine of a gas turbine engine may include diffuser holes. Diffuser holes are openings (e.g., through-hole openings) that are machined into a turbine blade and are useful for altering the aerodynamics or providing airflow to sections of the turbine blade that would not otherwise receive airflow. For example, the diffuser holes may create additional surfaces on the interior of the turbine blade. Airflow through the diffuser holes may provide cooling to the created surfaces of the turbine blade. Further, the diffuser holes may alter the aerodynamics of the blade, for example, to prevent Mach speeds from occurring or providing improved stability to the turbine blades. Moreover, the diffuser holes may adjust the flow of the combustion gases through the turbine. For example, the diffuser holes may mix the combustion gases to provide a more homogenous mixture.

Manufacturing a diffuser hole may include certain techniques described in more detail below. For example, a diffuser hole design may be created as a model-based definition included in a 3-dimensional (3D) computer aided design (CAD) model. Further, a manufacturing machine that creates the diffuser holes may utilize a coordinate system different from the one used in the CAD model. The techniques described herein may allow for a CAD model to be translated to a machine coordinate system to allow a machine to manufacture the diffuser hole. More specifically, the techniques described herein leverage model geometry to create an input file required for an accurate machine procedure on a turbine blade, such as a laser microjet (LMJ) procedure. Rather than sending calculated distances and angles to an LMJ program, the techniques described herein use model data (e.g., design CAD model data) to determine more precise corner points in an X-Y coordinate system used by the LMJ machinery in order to create substantially the same geometry on the component (e.g., turbine blade) as what is in the model that has been analyzed.

With the foregoing in mind, it may be useful to describe a computer-aided technologies (CAx) system that may incorporate the techniques described herein, for example to improve product lifecycle management (PLM) processes and to create and manufacture more precise parts, including diffuser holes in turbine blades. Accordingly, FIG. 1 illustrates an embodiment of a CAx system 10 suitable for providing for a variety of processes, including PLM processes 12, 14, 16, 18, 20, 22. In the depicted embodiment, the CAx system 10 may include support for execution of conception processes 12. For example, the conception processes 12 may produce a set of specifications such as requirements specifications documenting a set of requirements to be satisfied by a design, a part, a product, or a combination thereof. The conception processes 12 may also produce a concept or prototype for the part or product (e.g., machine). A series of design processes 14 may then use the specifications and/or prototype to produce, for example, one or more 3D design models of the part or product. The 3D design models may include solid/surface modeling, parametric models, wireframe models, vector models, non-uniform rational basis spline (NURBS) models, geometric models, and the like.

Design models may then be further refined and added to via the execution of development/engineering processes 16. The development/engineering processes may, for example, create and apply models such as thermodynamic models, low cycle fatigue (LCF) life prediction models, multibody dynamics (MBD) and kinematics models, computational fluid dynamics (CFD) models, finite element analysis (FEA) models, and/or 3-dimension to 2-dimension FEA mapping models that may be used to predict the behavior of the part or product during its operation. For example, turbine blades may be modeled to predict fluid flows, pressures, clearances, and the like, during operations of a gas turbine engine. The development/engineering processes 16 may additionally result in tolerances, materials specifications (e.g., material type, material hardness), clearance specifications, and the like.

The CAx system 10 may additionally provide for manufacturing processes 18 that may include manufacturing automation support. For example, additive manufacturing models may be derived, such as 3D printing models for material jetting, binder jetting, vat photopolymerization, powder bed fusion, sheet lamination, directed energy deposition, material extrusion, and the like, to create the part or product. Other manufacturing models may be derived, such as computer numeric control (CNC), laser micro jet (LMJ), or electric discharge machining (EDM) models with G-code to machine or otherwise remove material to produce the part or product (e.g., via milling, lathing, plasma cutting, wire cutting, and so on). Bill of materials (BOM) creation, requisition orders, purchasing orders, and the like, may also be provided as part of the manufacture processes 18 (or other PLM processes).

The CAx system 10 may additionally provide for verification and/or validation processes 20 that may include automated inspection of the part or product as well as automated comparison of specifications, requirements, and the like. In one example, a coordinate-measuring machine (CMM) process may be used to automate inspection of the part or product. After the part is inspected, results from the CMM process may be automatically generated via an electronic Characteristic Accountability & Verification (eCAV) system.

A servicing and tracking set of processes 22 may also be provided via the CAx system 10. The servicing and tracking processes 22 may log maintenance activities for the part, part replacements, part life (e.g., in fired hours), and so on. As illustrated, the CAx system 10 may include feedback between the processes 12, 14, 16, 18, 20, 22. For example, data from services and tracking processes 22, for example, may be used to redesign the part or product via the design processes 14. Indeed, data from any one of the processes 12, 14, 16, 18, 20, 22 may be used by any other of the processes 12, 14, 16, 18, 20, 22 to improve the part or product or to create a new part or a new product. In this manner, the CAx system 10 may incorporate data from downstream processes and use the data to improve the part or to create a new part.

The CAx system 10 may additionally include one or more processors 24 and a memory system 26 that may execute software programs to perform the disclosed techniques. Moreover, the processors 24 may include multiple microprocessors, one or more "general-purpose" microprocessors, one or more special-purpose microprocessors, and/or one or more application specific integrated circuits (ASICS), or some combination thereof. For example, the processors 24 may include one or more reduced instruction set (RISC) processors. The memory system 26 may store information such as control software, look up tables, configuration data, etc. The memory system 26 may include a tangible, non-transitory, machine-readable medium, such as a volatile memory (e.g., a random access memory (RAM)) and/or a nonvolatile memory (e.g., a read-only memory (ROM), flash memory, a hard drive, or any other suitable optical, magnetic, or solid-state storage medium, or a combination thereof).

Figure 2:
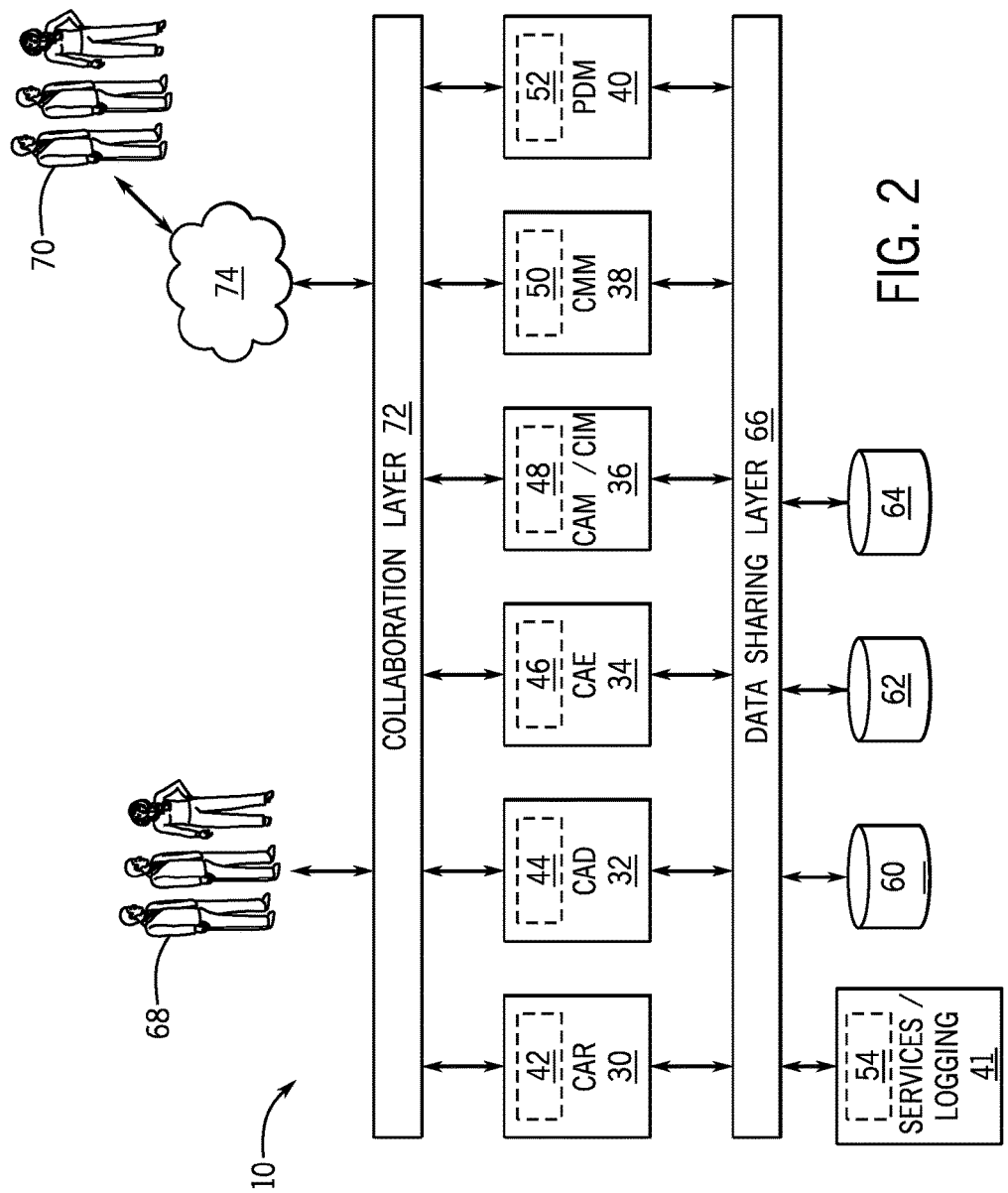
FIG. 2 is a block diagram of a certain components of the CAx system of FIG. 1.

The memory system 26 may store a variety of information, which may be suitable for various purposes. For example, the memory system 26 may store machine-readable and/or processor-executable instructions (e.g., firmware or software) for the processors' 24 execution. In one embodiment, the executable instructions include instructions for a number of PLM systems, for example software systems, as shown in the embodiment of FIG. 2. More specifically, the CAx system 10 embodiment illustrates a computer-aided requirements capture (CAR) system 30, a computer-aided design (CAD) system 32, a computer-aided engineering (CAE) system 34, computer-aided manufacturing/computer-integrated manufacturing (CAM/CIM) system 36, a coordinate-measuring machine (CMM) system 38, and a product data management (PDM) system 40. Each of the systems 30, 32, 34, 36, 38 and 40 may be extensible and/or customizable, accordingly, each system 30 may include an extensibility and customization system 42, 44, 46, 48, 50, and 52, respectively. Additionally, each of the systems 30, 32, 34, 36, 38 and 40 may be stored in a memory system, such as memory system 26, and may be executable via a processor, such as via processors 24.

In the depicted embodiment, the CAR system 30 may provide for entry of requirements and/or specifications, such as dimensions for the part or product, operational conditions that the part or product is expected to encounter (e.g., temperatures, pressures), certifications to be adhered to, quality control requirements, performance requirements, and so on. The CAD system 32 may provide for a graphical user interface suitable to create and manipulate graphical representations of 2D and/or 3D models as described above with respect to the design processes 14. For example, the 3D design models may include solid/surface modeling, parametric models, wireframe models, vector models, non-uniform rational basis spline (NURBS) models, geometric models, and the like. The CAD system 32 may provide for the creation and update of the 2D and/or 3D models and related information (e.g., views, drawings, annotations, notes, and so on). Indeed, the CAD system 32 may combine a graphical representation of the part or product with other, related information.

The CAE system 34 may enable creation of various engineering models, such as the models described above with respect to the development/engineering processes 16. For example, the CAE system 34 may apply engineering principles to create models such as thermodynamic models, low cycle fatigue (LCF) life prediction models, multibody dynamics (MBD) and kinematics models, computational fluid dynamics (CFD) models, finite element analysis (FEA) models, and/or 3-dimension to 2-dimension FEA mapping models. The CAE system 34 may then apply the aforementioned models to analyze certain part or product properties (e.g., physical properties, thermodynamic properties, fluid flow properties, and so on), for example, to better match the requirements and specifications for the part or product.

The CAM/CIM system 36 may provide for certain automation and manufacturing efficiencies, for example, by deriving certain programs or code (e.g., G-code) and then executing the programs or code to manufacture the part or product. In particular, a CAD model may use a different coordinate system from a manufacturing machine. In order to automate the operation of the manufacturing machine, the coordinate system of the CAD model is translated a coordinate system of the manufacturing machine. The CAM/CIM system 36 may support certain automated manufacturing techniques, such as additive (or subtractive) manufacturing techniques, including material jetting, binder jetting, vat photopolymerization, powder bed fusion, sheet lamination, directed energy deposition, material extrusion, milling, lathing, plasma cutting, wire cutting, laser micro jetting (LMJ), electric discharge machining, or a combination thereof. The CMM system 38 may include machinery to automate inspections. For example, probe-based, camera-based, and/or sensor-based machinery may automatically inspect the part or product to ensure compliance with certain design geometries, tolerances, shapes, and so on.

The PDM system 40 may be responsible for the management and publication of data from the systems 30, 32, 34, 36, and/or 38. For example, the systems 30, 32, 34, 36, and/or 38 may communicate with data repositories 60, 62, 64 via a data sharing layer 62. The PDM system 40 may then manage collaboration between the systems 30, 32, 34, 36, and/or 38 by providing for data translation services, versioning support, archive management, notices of updates, and so on. The PDM system 40 may additionally provide for business support such as interfacing with supplier/vendor systems and/or logistics systems for purchasing, invoicing, order tracking, and so on. The PDM system 40 may also interface with service/logging systems (e.g., service center data management systems) to aid in tracking the maintenance and life cycle of the part or product as it undergoes operations. Teams 64, 66 may collaborate with team members via a collaboration layer 68. The collaboration layer may include web interfaces, messaging systems, file drop/pickup systems, and the like, suitable for sharing information and a variety of data. The collaboration layer 68 may also include cloud-based systems 70 or communicate with the cloud-based systems 70 that may provide for decentralized computing services and file storage. For example, portions (or all) of the systems 30, 32, 34, 36, 38 may be stored in the cloud 70 and/or accessible via the cloud 70.

Once the design is updated, the part may then be manufactured and then inspected, for example via the CMM system. In one embodiment, the CAD system may automatically generate CMM code (e.g., dimension suitable for inspecting the manufactured design. For example, the code (e.g., dimensional measuring interface standard [DMIS] code, CALYPSO code) may include a set of locations on the part or product that the CMM system may inspect via a probe, a laser, a camera, and so on. The code may additionally include travel paths, a complete measurement plan, allowable variations, for example, in geometry, and so on.

The extensibility and customization systems 42, 44, 46, 48, 50, and 52 may provide for functionality not found natively in the CAR system 30, the CAD system 32, the CAM/CIM system 36, the CMM system 38 and/or the PDM system 40. For example, computer code or instructions may be added to the systems 30, 32, 34, 36, and/or 38 via shared libraries, modules, software subsystems and the like, included in the extensibility and customization systems 42, 44, 46, 48, 50, and/or 52. The extensibility and customization systems 42, 44, 46, 48, 50, and 52 may also use application programming interfaces (APIs) included in their respective systems 30, 32, 34, 36, and 38 to execute certain functions, objects, shared data, software systems, and so on, useful in extending the capabilities of the CAR system 30, the CAD system 32, the CAM/CIM system 36, the CMM system 38 and/or the PDM system 40. By enabling the processes 12, 14, 16, 18, 20, and 22, for example, via the systems 30, 32, 34, 36, and 38 and their respective extensibility and customization systems 42, 44, 46, 48, 50, and 52, the techniques described herein may provide for a more efficient "cradle-to-grave" product lifecycle management.

Figure 3:
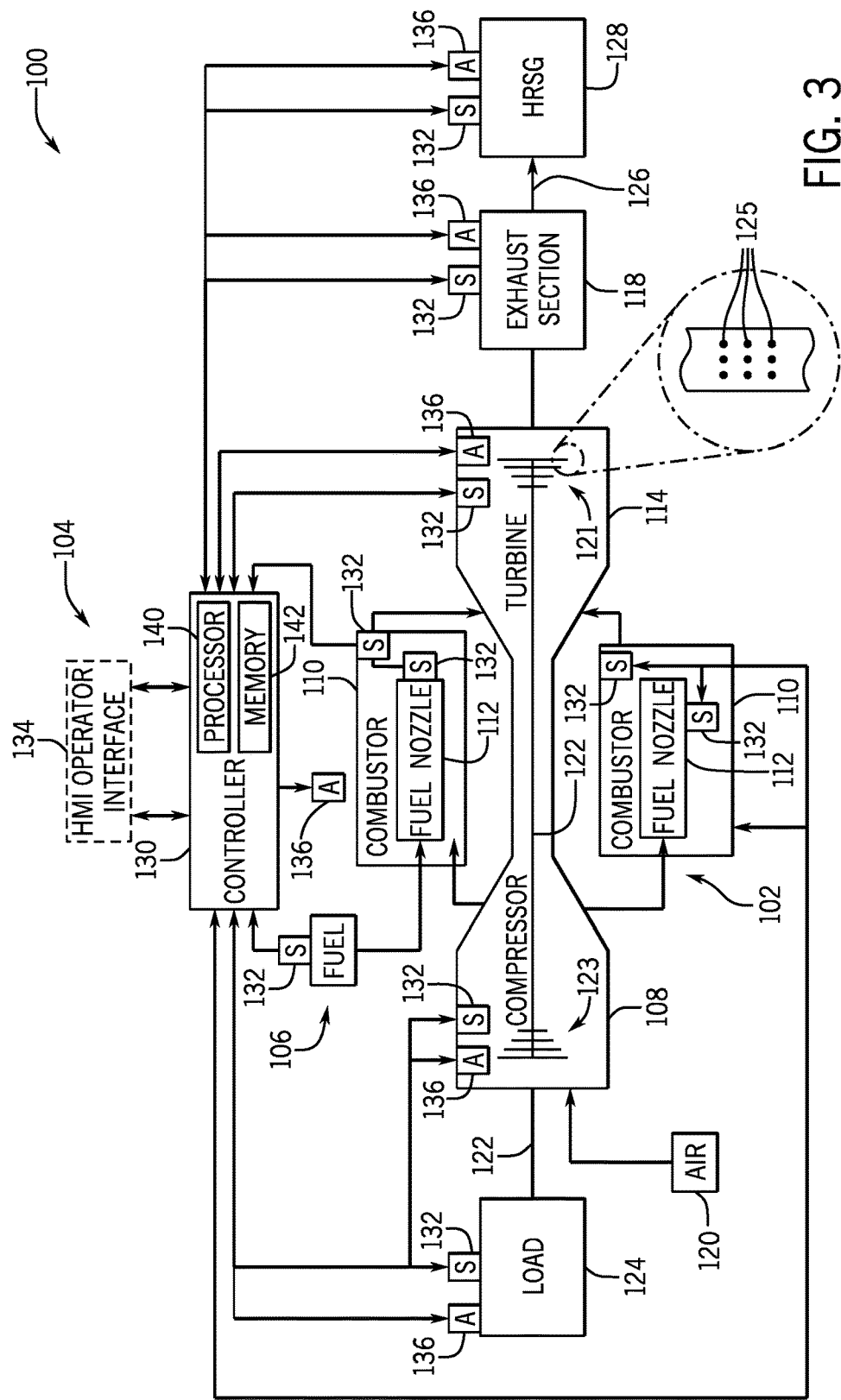
FIG. 3 is block diagram of an industrial system that may be conceived, designed, engineered, manufactured, and/or service and tracked by the CAx system of FIG. 1.

It may be beneficial to describe a machine that would incorporate one or more parts manufactured and tracked by the processes 12, 14, 16, 18, 20, and 22, for example, via the CAx system 10. Accordingly, FIG. 3 illustrates an example of a power production system 100 that may be entirely (or partially) conceived, designed, engineered, manufactured, serviced, and tracked by the CAx system 10. As illustrated in FIG. 1, the power production system 100 includes a gas turbine system 102, a monitoring and control system 104, and a fuel supply system 106. The gas turbine system 102 may include a compressor 108, combustion systems 110, fuel nozzles 112, a gas turbine 114, and an exhaust section 118. During operation, the gas turbine system 102 may pull air 120 into the compressor 108, which may then compress the air 120 and move the air 120 to the combustion system 110 (e.g., which may include a number of combustors). In the combustion system 110, the fuel nozzle 112 (or a number of fuel nozzles 112) may inject fuel that mixes with the compressed air 120 to create, for example, an air-fuel mixture.

The air-fuel mixture may combust in the combustion system 110 to generate hot combustion gases, which flow downstream into the turbine 114 to drive one or more turbine stages. For example, the combustion gases may move through the turbine 114 to drive one or more stages of turbine blades 121, which may in turn drive rotation of a shaft 122. The turbine blades 121 may include a plurality of diffuser holes 125. The diffuser holes 125 may adjust the aerodynamics of the turbine blades 121, as well as provide cooling to the turbine blades 121, to prevent Mach speeds, or for some other aerodynamic purposes.

The shaft 122 may connect to a load 124, such as a generator that uses the torque of the shaft 122 to produce electricity. After passing through the turbine 114, the hot combustion gases may vent as exhaust gases 126 into the environment by way of the exhaust section 118. The exhaust gas 126 may include gases such as carbon dioxide ($CO_2$), carbon monoxide (CO), nitrogen oxides ($NO_x$), and so forth.

The exhaust gas 126 may include thermal energy, and the thermal energy may be recovered by a heat recovery steam generation (HRSG) system 128. In combined cycle systems, such as the power plant 100, hot exhaust 126 may flow from the gas turbine 114 and pass to the HRSG 128, where it may be used to generate high-pressure, high-temperature steam. The steam produced by the HRSG 128 may then be passed through a steam turbine engine for further power generation. In addition, the produced steam may also be supplied to any other processes where steam may be used, such as to a gasifier used to combust the fuel to produce the untreated syngas. The gas turbine engine generation cycle is often referred to as the "topping cycle," whereas the steam turbine engine generation cycle is often referred to as the "bottoming cycle." Combining these two cycles may lead to greater efficiencies in both cycles. In particular, exhaust heat from the topping cycle may be captured and used to generate steam for use in the bottoming cycle.

In certain embodiments, the system 100 may also include a controller 130. The controller 130 may be communicatively coupled to a number of sensors 132, a human machine interface (HMI) operator interface 134, and one or more actuators 136 suitable for controlling components of the system 100. The actuators 136 may include valves, switches, positioners, pumps, and the like, suitable for controlling the various components of the system 100. The controller 130 may receive data from the sensors 132, and may be used to control the compressor 108, the combustors 110, the turbine 114, the exhaust section 118, the load 124, the HRSG 128, and so forth.

In certain embodiments, the HMI operator interface 134 may be executable by one or more computer systems of the system 100. A plant operator may interface with the industrial system 10 via the HMI operator interface 44. Accordingly, the HMI operator interface 134 may include various input and output devices (e.g., mouse, keyboard, monitor, touch screen, or other suitable input and/or output device) such that the plant operator may provide commands (e.g., control and/or operational commands) to the controller 130.

The controller 130 may include a processor(s) 140 (e.g., a microprocessor(s)) that may execute software programs to perform the disclosed techniques. Moreover, the processor 140 may include multiple microprocessors, one or more "general-purpose" microprocessors, one or more special-purpose microprocessors, and/or one or more application specific integrated circuits (ASICS), or some combination thereof. For example, the processor 39 may include one or more reduced instruction set (RISC) processors. The controller 130 may include a memory device 142 that may store information such as control software, look up tables, configuration data, etc. The memory device 142 may include a tangible, non-transitory, machine-readable medium, such as a volatile memory (e.g., a random access memory (RAM)) and/or a nonvolatile memory (e.g., a read-only memory (ROM), flash memory, a hard drive, or any other suitable optical, magnetic, or solid-state storage medium, or a combination thereof).

Figure 4:
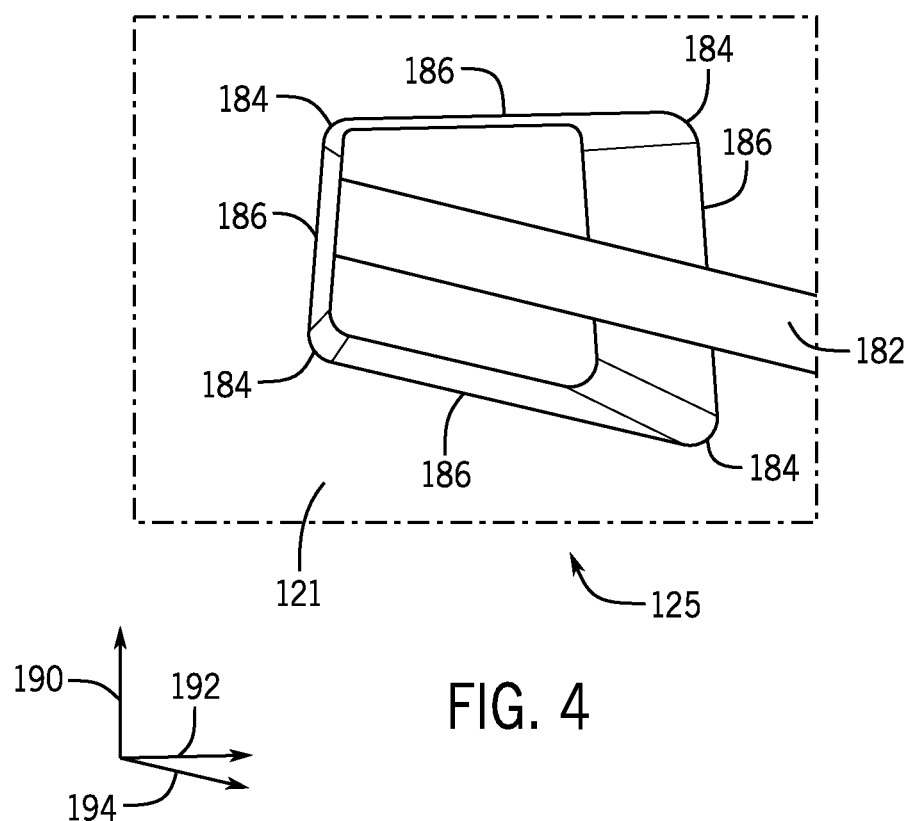
FIG. 4 is a perspective view of an embodiment of a diffuser hole disposed within a blade.

FIG. 4 is a perspective view of an embodiment, of one of the diffuser holes 125 disposed in one of a turbine blade 121. It should be noted, that although the diffuser hole 125 is depicted on the turbine blade 121, the diffuser hole 125 may be disposed on any suitable part, including compressor blades or components within the combustor 110, the exhaust section 118, or the HRSG 128. The diffuser hole 125 extends through the turbine blade 121 at least partially, and, in some embodiments, fully through the turbine blade 121. The diffuser hole 125 allows some of the combustion gases to pass through the turbine blade 121. This flow of combustion gases may provide cooling or altered aerodynamics to the turbine blade 121. The turbine blade 121 may include a large number of diffuser holes, including 10, 20, 50, 100, 200, or more diffuser holes.

A vector 182 is shown passing through the middle of the diffuser hole 125. In the present embodiment, the vector 182 is approximately normal (i.e., within 10 degrees) to the diffuser hole 125; however, it should be appreciated, that the vector 182 may be at any suitable angle relative to the diffuser hole 125, including 40 degrees, 50 degrees, 60 degrees, 70 degrees, 80 degrees, or 90 degrees. The vector 182 may be constructed as a virtual construct in a CAD model that also includes the diffuser hole 125 and used, for example, to improve manufacturing of the diffuser hole 125.

The opening of the diffuser hole 125 may be a quadrilateral formed by corners 184 and edges 186. The corners 184 are formed at the intersections of the edges 186. In the present embodiment, the corners 184 are rounded about an inner radius; however, it should be appreciated that the corners may include any suitable geometry, including being more or less rounded or having sharp edges. As shown, the edges 186 are not parallel; however, in alternative designs, the edges 186 may form a parallelogram, a trapezoid, or any other suitable quadrilateral. Further, other embodiments may include diffuser holes 125 with more or less edges 186, including 3, 5, 6, 7, 8, 9, or more edges 186.

The opening of the diffuser holes 125 is disposed on the surface of the turbine blade 121. Accordingly, the position of the opening of the diffuser hole 125 may be defined by coordinates of a plane defined by the intersection of a longitudinal axis 190 and a lateral axis 192. Further, a three dimensional space may be defined by including a vertical axis 194. In embodiments where the vector 182 is normal to the diffuser hole 125, the vector 182 may serve as the vertical axis 194. Further, because the turbine blade 121 may be curved, the position of the opening of the diffuser hole 125 may not perfectly defined by coordinates of a plane, and may require three-dimensional coordinates. The techniques described herein provide for leveraging model geometry (e.g., CAD model geometry) to create an input file required for an accurate machine procedure on a turbine blade, such as a laser microjet (LMJ) procedure. Rather than sending calculated distances and angles to an LMJ program, the techniques described herein use model data (e.g., design CAD model data) to determine more precise corner points in an X-Y coordinate system used by the LMJ machinery in order to create substantially the same geometry on the component (e.g., turbine blade) as what is in the model that has been analyzed. Accordingly, the diffuser hole 125 may be more accurately "cut" via the LMJ system.

Figure 5:
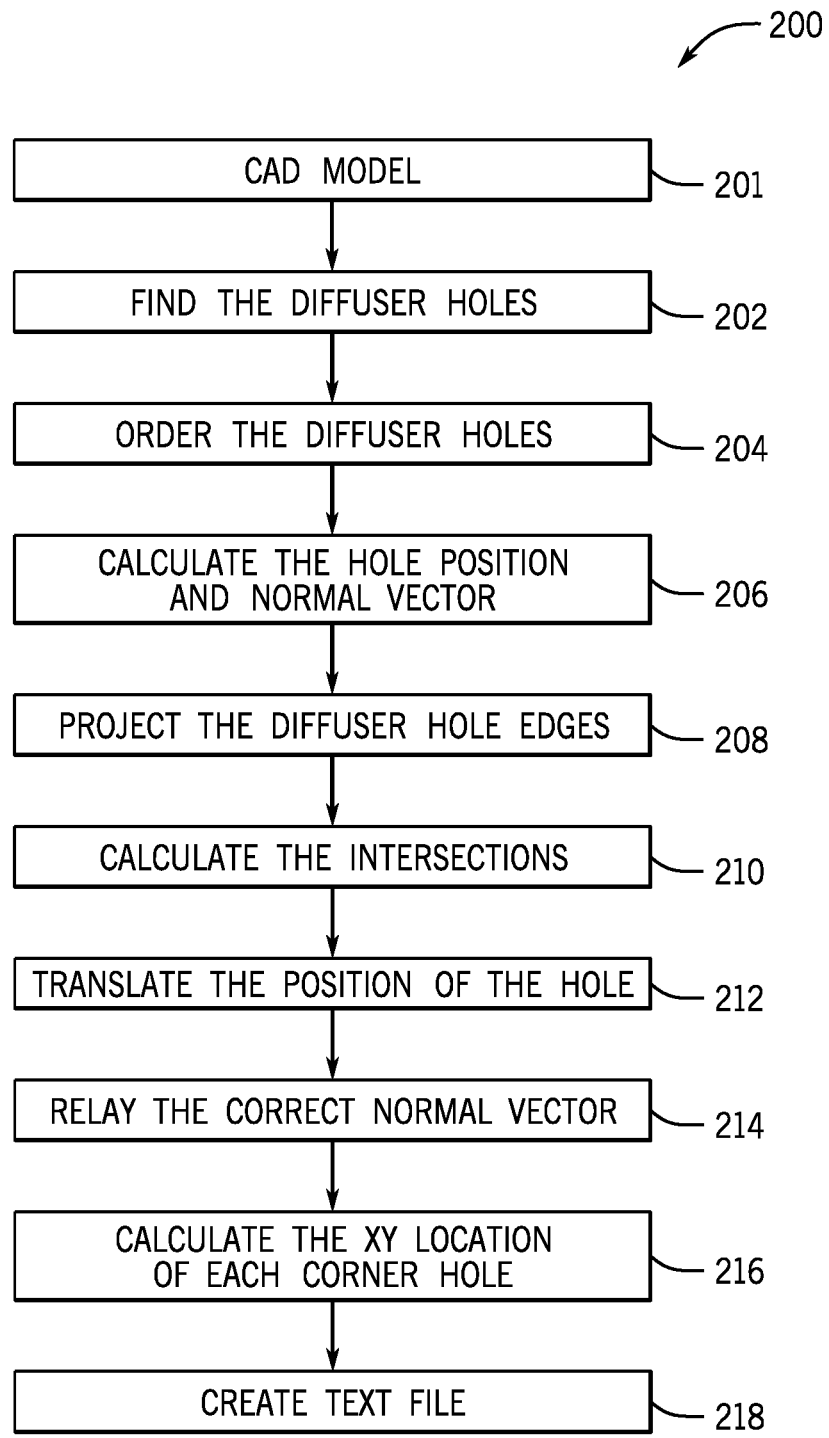
FIG. 5 is a flow chart depicting an embodiment of a process for generating code and executing the code to create the diffuser hole depicted in FIG. 4.

FIG. 5 is a flow chart illustrating an embodiment of a process 200 suitable for manufacturing of the diffuser holes 125. Although the process 200 describes a number of operations that may be performed, it should be noted that the process 200 may be performed in a variety of suitable orders. All of the operations of the process 200 may not be performed. Further, all of the operations of the process 200 may be performed by the processors 24 and/or the CAx system 10. For example, the CAD system 32, CAE system 34, and/or CAM/CIM system 36 may be used to design, engineer, and subsequently manufacture the turbine blades 121 having diffuser holes 125.

The process 200 may use a CAD model 201 of the turbine blade 121 with diffuser holes 125 as input. The CAD model 201 may include solid/surface model features, parametric model features, wireframe model features, vector model features, non-uniform rational basis spline (NURBS) model features, geometric model features, and the like, used to describe geometries of the turbine blade 121 having the diffuser holes 125. After receiving the CAD model 201, the process 200 may iterate through the model 201 and find (block 202) the diffuser holes 125. The process 200 may then order (block 204) the diffuser holes 125. The diffuser holes 125 may be ordered in any suitable manner, including by their longitudinal and axial positions. The process 200 may then calculate (block 206) the position of the diffuser holes 125 and the vector 182 for each diffuser hole. As previously discussed, the vector 182 may be normal to the diffuser hole 125 (e.g., perpendicular to a surface plane of the turbine blade 121). Also, as previously discussed, the diffuser holes 125 may not lie on a flat plane because the turbine blade 121 may not be flat and may include curved surfaces. Accordingly, the process 200 projects (block 208) the edges 186 of the diffuser hole 125 onto a flat plane. The vector 182 may be at the same angle relative to this plane as it is relative to the diffuser hole 125 (e.g., a normal angle).

Then, the process 200 may calculate (block 210) the intersections of the edges 186 which form the corners 184. Next, the process 200 translates (block 212) the position of the diffuser hole 125 from the coordinate system used in the CAD model 201, and the projections, to a coordinate system used by a manufacturing machine (e.g., a laser micro jet, an electrodischarge machine, a high pressure water jet, a mechanical drill, etc.). In some applications, the manufacturing machine may operate from a vector different from the vector 182. In these applications, an input file is read by the processors 24. The input file transforms (block 214) the vector 182 to the vector used by the manufacturing machine in creating the diffuser hole 125. Then, the process 200 calculates (block 216) the x-y location of each corner 184 of each diffuser hole 125. The calculations can be based on the vector 182 serving as the z-axis and the x and y axes being parallel to the x and y axes of the coordinate system used by the manufacturing machine. After completing all of the transformations, the process 200 may create (block 218) a file required by the manufacturing machine to manufacture the diffuser holes 125. This file may utilize the same order of diffuser holes as created in block 204, or a different order.

After the file is created by the processor 24, the manufacturing machine may then remove material from the turbine blade 121 to create the diffuser hole 125. In some embodiments, the turbine blade 121 is first coated with a ceramic coating. As such, certain types of material removal processes are more effective. For example, a laser micro jet may be used to first remove the ceramic coating. Then a different, faster material removal process (e.g., electrodischarge machining, drilling) may be utilized to remove the remaining material required to complete the diffuser hole.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A computer aided technology (CAx) system, comprising:
a processor configured to:
    receive a design model for a blade having a plurality of diffuser holes, each diffuser hole having a model-based vector;
    derive a hole position and a manufacturing vector for each of the plurality of diffuser holes;
    translate the hole position and the manufacturing vector to a machine coordinate system to create a translated hole position and a translated manufacturing vector; and
    generate a manufacturing program based on the translated hole position and the translated manufacturing vector, wherein the blade comprises a stator vane, a rotor vane, or a combination thereof, included in a compressor, a gas turbine engine, or a combination thereof, wherein each of the plurality of diffuser holes comprises a through-hole configured to allow gases to pass through the blade during operations of the blade, wherein the model-based vector is normal relative to the model coordinate system and wherein the manufacturing vector is normal relative to the machine coordinate system, and wherein the translated manufacturing vector is applied via a manufacturing machine having the machine coordinate system for through hole manufacturing of the plurality of diffuser holes.

2. The system of claim 1, wherein the normal vector comprises the z-axis of the machine coordinate system.

3. The system of claim 1, wherein the design model comprises a computer aided design (CAD) three-dimensional (3D) model of the blade.

4. The system of claim 1, wherein the processor is configured to order the plurality of diffuser holes based on a radial order, an axial order, or a combination thereof, before deriving the hole position and the manufacturing vector.

5. The system of claim 1, wherein the processor is configured to project a plurality of edges of each of the plurality of diffuser holes to a flat plane and wherein the manufacturing vector is at a first angle relative to the flat plane and the manufacturing vector is at a second angle relative to each of the plurality of diffuser holes, and the first angle and the second angle are the same.

6. The system of claim 1, wherein the processor is configured to derive an intersection of one or more edges of each of the plurality of diffuser holes.

7. The system of claim 1, wherein the processor is configured to calculate an x-y position for the hole position based on the manufacturing vector corresponding to a z-axis and based on a first x-axis being parallel to a second x-axis of the machine coordinate system.

8. The system of claim 1, wherein the processor is configured to execute the manufacturing program to operate the manufacturing machine, wherein the manufacturing machine comprises a laser, an electric discharge machine, or a combination thereof, to manufacture the plurality of diffuser holes on the blade.

9. The system of claim 1, wherein the manufacturing program comprises a first code to operate a laser to manufacture a first hole for each of the plurality of diffuser holes, and a second code to operate an electric discharge machine to manufacture a second hole for each of the plurality of diffuser holes, and wherein the processor is configured to execute the first code before executing the second code.

10. A method, comprising:
receiving, via a processor, a design model for a blade having a plurality of diffuser holes, each diffuser hole having a model-based vector;
deriving, via the processor, a hole position and a manufacturing vector for each of the plurality of diffuser holes;
translating, via the processor, the hole position and the manufacturing vector to a machine coordinate system to create a translated hole position and a translated manufacturing vector; and
generating, via the processor, a manufacturing program based on the translated hole position and the translated manufacturing vector, wherein the blade comprises a stator vane, a rotor vane, or a combination thereof, included in a compressor, a gas turbine engine, or a combination thereof, wherein each of the plurality of diffuser holes comprises a through-hole configured to allow gases to pass through the blade, during operations of the blade, wherein the model-based vector is normal relative to a model coordinate system and wherein the manufacturing vector is normal relative to the machine coordinate system, and wherein the translated manufacturing vector is applied via a manufacturing machine having the machine coordinate system for through hole manufacturing of the plurality of diffuser holes.

11. The method of claim 10, comprising ordering, via the processor, the plurality of diffuser holes based on a radial order, an axial order, or a combination thereof, before deriving the hole position and the manufacturing vector.

12. The method of claim 11, comprising projecting, via the processor, a plurality of edges of each of the plurality of diffuser holes to a flat plane and wherein an angle between the manufacturing vector and the flat plane is the approximately the same as the angle between the vector and each of the plurality of diffuser holes.

13. The method of claim 12, comprising deriving, via the processor, the intersection of one or more edges of each of the plurality of diffuser holes.

14. The method of claim 13, comprising calculating, via the processor, an x-y position for the hole position based on the manufacturing vector corresponding to a z-axis and based on a first x-axis being parallel to a second x-axis of the machine coordinate system.

15. One or more tangible, non-transitory, machine-readable media comprising instructions configured to cause a processor to:
receive a design model for a blade having a plurality of diffuser holes each diffuser hole having a model-based vector;
derive a hole position and a manufacturing vector for each of the plurality of diffuser holes;
translate the hole position and the manufacturing vector to a machine coordinate system to create a translated hole position and a translated manufacturing vector; and
generate a manufacturing program based on the translated hole position and the vector, wherein the blade comprises a stator vane, a rotor vane, or a combination thereof, included in a compressor, a gas turbine engine, or a combination thereof, wherein each of the plurality of diffuser holes comprises a through-hole configured to allow gases to pass through the blade during operations of the blade, wherein the model-based vector is normal relative to the model coordinate system and wherein the manufacturing vector is normal relative to the machine coordinate system, and wherein the translated manufacturing vector is applied via a manufacturing machine having the machine coordinate system for through hole manufacturing of the plurality of diffuser holes.

16. The one or more tangible, non-transitory, machine-readable media comprising instructions of claim 15, configured to cause the processor to order the plurality of diffuser holes based on a radial order, an axial order, or a combination thereof, before deriving the hole position and the manufacturing vector.

17. The one or more tangible, non-transitory, machine-readable media comprising instructions of claim 16, configured to cause the processor to project a plurality of edges of each of the plurality of diffuser holes to a flat plane and wherein an angle between the manufacturing vector and the flat plane is the approximately the same as the angle between the manufacturing vector and each of the plurality of diffuser holes.

18. The one or more tangible, non-transitory, machine-readable media comprising instructions of claim 17, configured to cause the processor to derive the intersection of one or more edges of each of the plurality of diffuser holes.

19. The one or more tangible, non-transitory, machine-readable media comprising instructions of claim 18, configured to cause the processor to calculate an x-y position for the hole position based on the manufacturing vector corresponding to a z-axis and based on a first x-axis being parallel to a second x-axis of the machine coordinate system.

* * * * *